July 16, 1957 W. A. ANDRES ET AL 2,799,762
ELECTRIC HEATING ELEMENT
Filed Feb. 24, 1955 2 Sheets-Sheet 1
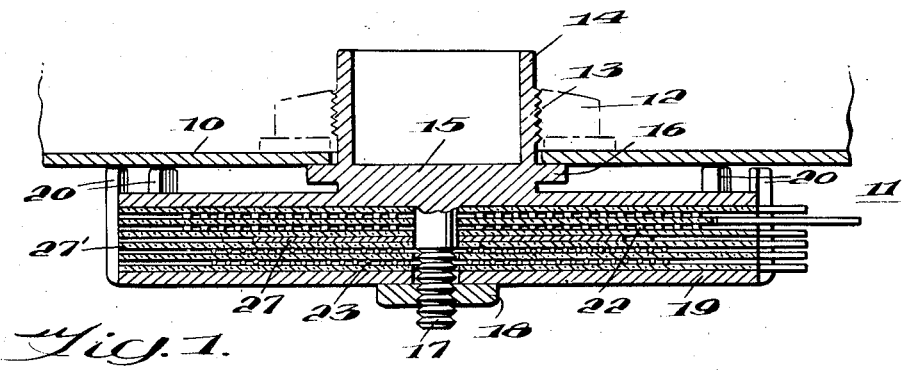
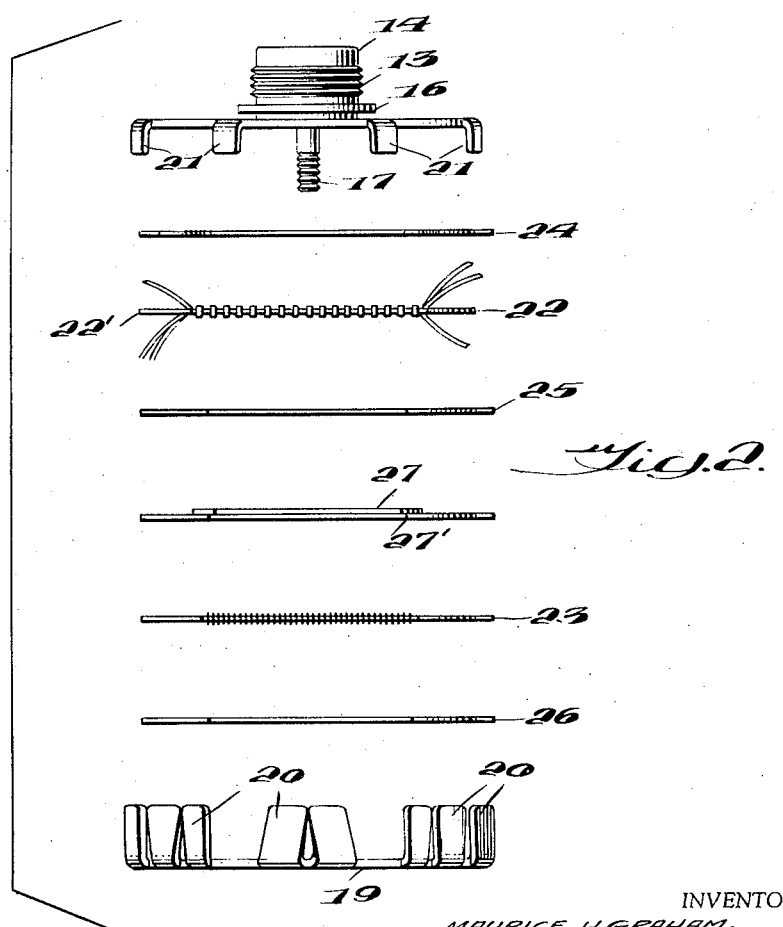
INVENTORS
MAURICE H. GRAHAM,
Deceased by Northwestern Nat'l Bank of Minneapolis,
Special Administrator, W. F. WECK, Asst. Tr. Officer
WILLIAM A. ANDRES
BY Barry & Heer
ATTORNEYS

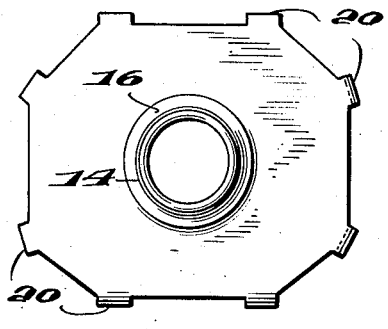
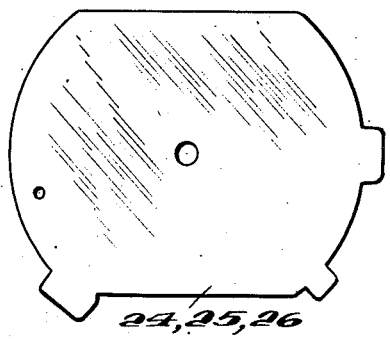
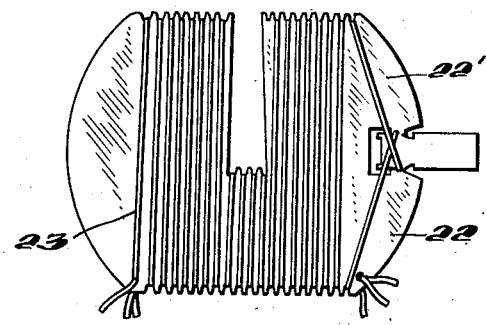
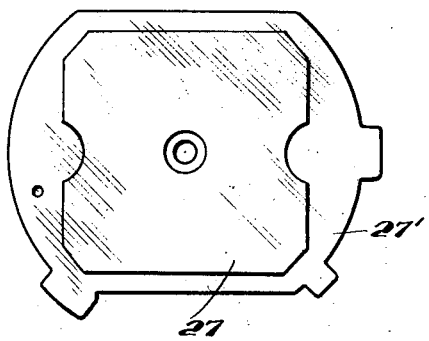
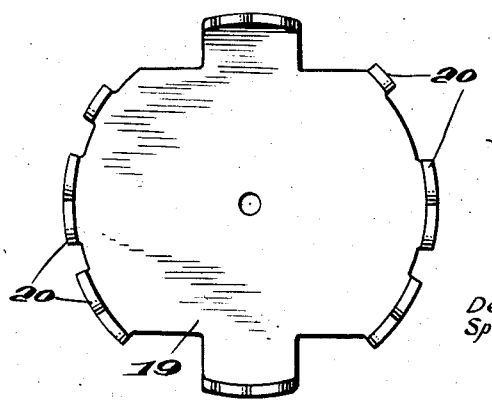
INVENTORS
MAURICE H. GRAHAM,
Deceased, By Northwestern Natl. Bank of Minneapolis,
Special Administrator, W. F. WECK, Asst. Tr. Officer
WILLIAM A. ANDRES
BY Parry + Gee
ATTORNEYS

United States Patent Office 2,799,762
Patented July 16, 1957

2,799,762

ELECTRIC HEATING ELEMENT

William A. Andres, Hopkins, Minn., and Maurice H. Graham, deceased, late of Minneapolis, Minn., by Northwestern National Bank of Minneapolis, administrator, Minneapolis, Minn., assignors, by mesne assignments, to The M. H. Graham Corporation, Minneapolis, Minn., a corporation of Minnesota Application February 24, 1955, Serial No. 490,244

1 Claim. (Cl. 219—19)

This invention relates generally to electric heating units and more particularly to such heating units of the type adapted to be operated in intimate contact with the lower wall surface of a fluid container or vessel to heat the contents thereof.

More specifically the invention relates to electric heating units which are subject to repeated cycles of operation, as for example heating units used with coffee makers, tea pots, containers for soup or hot fudge or the like, wherein the heating unit is of the external surface type rather than the so-called immersion type.

Additionally, the invention is equally adaptable for use in other applications requiring an external surface type of electric heat supply, as for example for heating the sole plate of a sadiron or flatiron, grille or waffle maker.

External surface type electric heating units in general comprise one or more resistance heating wires or grids disposed between insulator sheets of mica. Heat generated by the grids is transferred to a relatively thick heat conducting member or members, and the latter, in turn, transfers the heat to the surface to be heated. The combination of heating grids, insulation sheets, and heat conducting member(s) are generally assembled, sandwich-fashion, as a unitary structure.

A serious drawback in known external or open heating elements of the type described above is a tendency for the heating wires to burn out and become open-circuited. This tendency is accelerated where the heating element is operated cyclically from a cold to hot state. Heating wire burn outs are believed to be a result of the occurrence of localized hot spots at one or more points along the wire. Such hot spots may be due to discontinuities in the heating wire itself, or may be caused by voids or pockets in the adjacent insulation sheets which prevent the uniform transfer of heat from the wire.

Accordingly, the principal object of the present invention is to provide an electric heating element which obviates the drawbacks and disadvantages of the prior known devices.

A further object of the invention is to provide an electric heating element of improved and simplified construction which gives improved operating characteristics over an extended period of time without being subject to burn outs.

A more specific object of the invention is to provide an auxiliary member in an electric heating element which may continually act to prevent the occurrence of localized hot spots along the heating wire.

In particular it is an object of the present invention to incorporate a thermoactive or thermoresponsive material in an open sandwich type electric heating element whereby the continual expansion of such material may act to fill in any voids or pockets in the element to prevent the occurrence of any localized heat spots.

These and additional objects and attendant advantages will become more readily apparent upon a detailed reading of the accompanying specification and drawings of one form of the present invention, together with the appended claims.

Referring now more particularly to the drawings—

Figure 1 is a vertical sectional view through an electric heating element made in accordance with the present invention, showing the several parts in an assembled, operative relation;

Figure 2 is a partially schematic exploded side elevation of the assembly as shown in Figure 1; and Figures 3 to 7 are plan views of preferred embodiments of the several parts of an electric heating element which may be assembled as shown in Figure 1.

In the drawings element 10 indicates a metallic surface to which heat is to be supplied by an electric heating element indicated generally at 11. Surface 10 may be the lower wall member of a fluid container of a coffee maker vessel, for example, or it may be any metallic surface to be heated.

In a particular application wherein surface 10 is part of a coffee maker vessel, the heating element may be secured to the vessel by means of nut 12 which cooperates with threaded portion 13 of a hub 14 which is formed with or attached integrally to the relatively thick heat conducting member 15. A good heat conducting material such as copper or a copper alloy is preferred for parts 14 and 15. Member 15 has a planar surface of wide area to communicate the heat to surface 10, and hub 14 may be recessed to receive the usual coffee maker fountain tube, not shown. A gasketing flange 16 may be optionally provided to assist in maintaining a fluid-tight connection between element 11 and surface 10.

A threaded stud 17 is provided centrally at the lower surface of the heat conducting member to secure thereto the several additional component parts which make up heating element 11. A nut 18 rides on stud 17 and bears against the lower surface of a second relatively thick heat conducting backing element 19 preferably also made of a material such as copper or copper alloy. Backing element 19 is generally planar and has a plurality of peripheral edge extensions or ears 20 which are struck up normal to its surface to provide a cup-shape configuration. As shown in Figure 1, these ears 20 bear against surface 10 in an annular ring about hub 14 and serve as additional heat transfer means thereto, as will be more particularly described hereinafter. Heat conducting member 15 may be optionally provided with complementary struck down ears 21 to interlock with ears 20 of the backing element to provide additional rigidity and uniform heat transfer from the heating element assembly 11.

Nut 18 serves to compress the remaining parts of the assembly between member 15 and element 19. These parts comprise, in part, a first or primary heating wire or grid 22, a second heating wire or grid 23 similar in physical dimensions to grid 22 and of either the same or of different electrical heating properties, and a plurality of insulation sheets 24, 25 and 26. Grid parts 22 may consist of a plurality of turns of Nichrome or similar wire exhibiting the necessary high resistance heating effect, and such wire is preferably wound on an insulator form 22 [1] as shown more particularly in Figure 5. The heating wire or grid 23 is also formed upon an insulator form in a similar manner to that shown for grid 22. The insulator form 22 [1], as well as insulation sheets 24, 25, 26, which latter parts serve to prevent short-circuiting of the heating wires, may be formed of any desired insulating sheet stock, although in the preferred embodiment the material used is mica.

In the usual construction insulation sheet 24 may be of substantially thin cross section in order to allow more of the heat generated in primary grid 22 to transfer to heat conducting member 15. Grids 22 and 23 may be interconnected in a series relation adapted to be energized from a source of domestic line voltage at the usual convenience outlet. The interconnection of such grids may also include a thermostatically controlled shunting circuit and a heat indicator light whereby the second heating wire grid 23 may function as a low heat or warming means, all in the manner well known to those skilled in the art and which does not require further description or showing in that such interconnection is no part of the present invention.

So much of the electric heating element 11 thus far described is old in the art. The entire assembly will be drawn up snugly between member 15 and backing element 19 by means of nut 18 to insure maximum heat transfer between the several parts. However, due to variations in diameter of the wire in grids 22 and 23 or due to voids or air pockets in the insulation sheets, localized hot spots will often occur after the heating element is subjected to alternate cycles of heating and cooling. These may be due in part to an eventual break down in the insulation sheet material.

Whatever may be the cause of occurrence of such voids and consequent hot spots in the assembly, such occurrence may be greatly decreased and in most instances avoided altogether according to the present invention by the provision of an auxiliary element 27 made of thermoactive or thermoresponsive material in the electrical heating element assembly 11.

As more particularly shown in Figure 6, element 27 is of substantially smaller surface area than the heat conducting member 15 and the bottom element 19, being generally of an area coextensive with that covered by the heating wire grids 22 and 23. Accordingly, when subjected to cyclic heating by either grid 22 or grid 23, or the combination thereof, the thermoactive material is unable to conduct any substantial amount of heat by transfer to the larger surface areas at 15, 19 or 10, but is subjected to a concentrated and elevated heating whenever grids 22 or 23 are energized. Auxiliary element 27 may be mounted by bonding or gluing to an insulation form 27¹ for convenience and uniformity in adding it to the assembly 11.

Auxiliary element 27 is made of a thermoactive material of the type which exhibits a growth or creep characteristic when subjected to alternate heating and cooling cycles. Such creep or expansion phenomena is characterized by the fact that the thermoactive material does not shrink back to its original pre-heated dimension but remains in an enlarged state, with the growth effect being a cumulative one with every successive heating cycle. Several materials will exhibit this thermoactive growth effect, however in the preferred embodiment of the present invention element 27 may be made of 100% pure copper, with an optional barrel plating thereover if desired to avoid undesired oxidation effects. As clearly shown in Figures 1 and 2, auxiliary element 27 is sandwiched between heating wire grids 22 and 23 in such a manner as to be subjected to elevated heating whenever such grids are energized. The effect of such heating is to cause the growth of the material of element 27 so as to tend to continually fill and take up any void or air pocket which may form in the element 11 due to disintegration of the insulation sheets, non-uniformity of the heating wires, or other such cause of looseness, including loosening of nut 18. By eliminating the formation of voids in the assembly the cause of localized hot spots and consequent heating wire burn out is eliminated.

Preferably element 27 is made of a relatively thin cross-section of an average thickness of 0.010 to 0.015 inch when formed of pure copper, and as the element is subjected to cyclic elevated heating due to its juxtaposition between grids 22 and 23 with no direct heat transfer path to the surface 10, it undergoes a cumulative growth which effectually eliminates the formation of voids in the assembly 11, and thus reduces the occurrence of burn outs. An example of such growth characteristic of element 27 in a particular embodiment of the present invention, intended as illustrative only and not as any limitation to the scope of the invention, wherein the heat conducting member 15 and bottom element 19 have reached heats of approximately 300° F. and exhibited no growth tendencies due to their thicker cross-sections and alloyed copper content, the element 27 of thermoactive material reached heats ranging from 500° to 550° F. and exhibited growths ranging from 0.002 to 0.005 inch in thickness, and as much as 0.125 to 0.250 inch in lateral dimensions from an initial size of approximately 1.875 inches square by 0.010 to 0.015 inch in thickness. Such growth has been found unusually effective in preventing undesirable voids in the heating element assembly 11.

It will be understood that the foregoing embodiment of the invention is merely illustrative and that numerous variations and modifications may be made within the scope of the invention.

What is claimed is:

An electric heating assembly comprising a plurality of electrically isolated resistance coils in serial heat transfer relation by superposition, and means affecting an initial compressive stress on said assembly, including an element interposed in said assembly intermediate said coils having a cumulative heat growth characteristic at least in the direction of superposition of said coils to fill in voids and air pockets caused in said assembly by insulation, disintegration and non-uniformity of coil wires and the like, said element comprised of pure sheet copper of the order of 0.01 to 0.015 inch thick.

References Cited in the file of this patent

UNITED STATES PATENTS

| | | |
|---|---|---|
| 1,060,268 | Lamb | Apr. 29, 1913 |
| 1,120,259 | Wiegand | Dec. 8, 1914 |
| 1,492,160 | Colby | Apr. 29, 1924 |
| 2,080,800 | Wiegand | May 18, 1937 |
| 2,510,456 | Biebel | June 6, 1950 |
| 2,658,134 | Kircher | Nov. 3, 1953 |
| 2,680,800 | Chandler | June 8, 1954 |